Aug. 27, 1963 K. F. FRANK 3,102,195

PICKUP MEANS FOR PUNCHED DATA

Filed Jan. 16, 1961

INVENTOR.
KARL F. FRANK
BY James V. Malone 3,102,195

PICKUP MEANS FOR PUNCHED DATA

Karl F. Frank, Garden City, N.Y., assignor to Micro Balancing, Incorporated, a subsidiary of Giannini Scientific Corporation, Garden City Park, N.Y.

Filed Jan. 16, 1961, Ser. No. 82,930
2 Claims. (Cl. 250—49.5)

This invention relates to pickup means for punched tape or cards.

Conventional punched tape or cards are generally read or sensed by spring contacts which connect an electrical circuit between the holes in the tape or punched cards. The mechanical contacts are subject to mechanical wear and also to bouncing, arcing and pitting which results in poor sensitivity and resolution. For these reasons, conventional contacts are subject to considerable maintenance due to the mechanical wear and associated difficulties. Also the conventional contacts are relatively bulky and limit the amount of information that can be incorporated in a punched card or tape.

A principal object of this invention is to compress the sensing device into a small area of the tape or card surface and also obtain good resolution in response to the traverse of the punched slot without physical contact with the card or tape.

The pickup system consists of two opposing electrically conductive sharp points held in insulating material so as to provide sufficient space between the points to pull an insulating tape or card between the points without contacting the same. These points are mounted within an insulating block so that the point does not extend beyond the block surface, and are connected to a direct current voltage source, one point being in series with a resistor of sufficient value so as to create a voltage drop when a very small current flows. The voltage of the power supply must be high enough to have a corona discharge taking place when there is no insulating material between the points. However, the voltage must not be so high as to create an arc between the points as this would destroy the insulating material of the tape or card. It is a physical phenomena that corona discharges take place easiest and most accurately across sharp points and the discharge bears a direct relationship to the sharpness of these points. It is possible to put many points across a relatively narrow tape and therefore many bits of information can be put side by side on this tape or card.

Accordingly a principal object of the invention is to provide new and improved pickup means for punched cards or tape.

Another object of the invention is to provide new and improved pickup means for a punched card or tape utilizing corona discharge.

Another object of the invention is to provide new and improved pickup means for punched data material without any mechanical contact.

Another object of the invention is to provide new and improved pickup means for punched tape or cards which eliminates mechanical wear and arcing and pitting of contacts.

Another object of the invention is to provide new and improved means for punched card typing apparatus which has a minimum amount of maintenance and requires minimum space, thereby providing greater amounts of information per unit space on the card or tape.

Another object of the invention is to provide new and improved pickup means for punched cards or tape comprising a pair of conductive members having sharp points, said points being spaced sufficiently to pass a punched card or tape between them without any mechanical contact and a source of high voltage connected to said points, said voltage being adjusted to cause a corona discharge in the absence of the card or tape material between the points.

These and other objects of the invention will be apparent from the following specification and drawings, of which FIG. 1 is a detail view of the embodiment of the invention.

Figure 1:
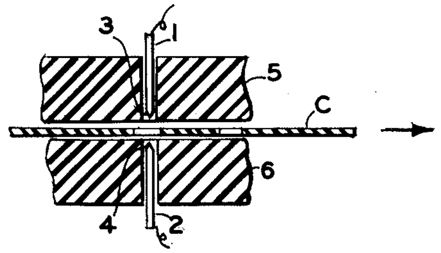

Referring to the figures the invention comprises a pair of conductive members 1 and 2 having sharp points 3 and 4 which may be needle points. The conductive members are mounted in insulating blocks 5 and 6 so that the points are spaced just enough to permit the card or tape C to be passed between the points without any mechanical contact.

A high voltage source 10 is connected to the points 1 and 2. The high voltage source is preferably a source of direct (D.C.) voltage and is preferably adjustable. It is adjusted so that the voltage is just high enough to cause a corona discharge between the needle points 3 and 4 in the absence of any insulating material between them. One of the needle points is connected to a high resistance 11 and the other end of the resistance is connected back to the voltage supply. The output voltage may be taken across the high resistance 11.

By corona discharge is meant an electric discharge between the needles not amounting to an arc. The causing of an arc is objectionable as it pits the points.

Due to the fact that the needle points are mounted along an axis the corona discharge will take place along an accurately defined straight line between the two points so that very high resolution may be obtained, as a slot edge passes said axis.

For instance, after the apparatus is properly adjusted, when a card is passed between the points there will be no output until one of the punched holes passes between the points. As soon as the leading edge of empty space of the punched portion appears between the points there will be a corona discharge between the needle points which causes electric current to flow in the output resistance 11. Since the corona discharge will only take place along the line defined by the two needle points, great sensitivity and very high resolution can be obtained.

Also, the punches on the cards or tape may be made very small and spaced close together so that a great deal of information may be incorporated on a relatively small space of the card or tape.

Figure 2:
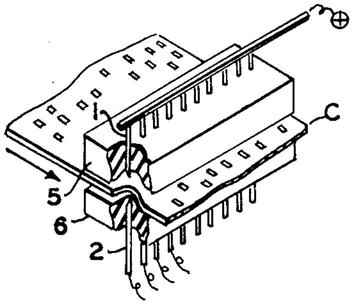
FIG. 2 is a perspective view of an embodiment of the invention.
Figure 3:
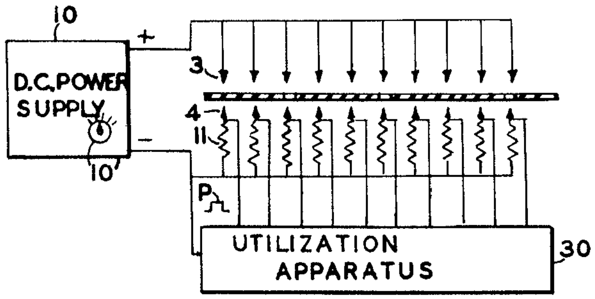
FIG. 3 is a schematic electrical circuit of the embodiment of FIG. 2.

The pairs of needle points may be mounted in any convenient arrangement depending upon the number of information channels on the card or tape. For instance, FIG. 2 shows 10 pairs of needles mounted in the insulating blocks 5 and 6 so that as the card C moves between the needle points the punched card information will be sensed in the ten different channels. Due to the high resolution and sensitivity of the present device provided by the opposing needle points, the channels may be made quite close together.

The present apparatus may be used with conventional punched cards of cardboard or with conventional plastic tape such as mylar tape. Such cards or tape may have a thickness of the order of .002" and the order of voltage for proper spacing would be on the order of 1,000 volts (D.C.). The point spacing is preferably as close as possible without physical contact with card or tape. The output resistor 11 may be of the order of 10 megohms. The outputs may be connected to conventional utilization apparatus 30 such as used with conventional punch card or tape apparatus.

If the pickups of the present invention are desired to be used for different thickness cards or tape then the conductive needle point members and mounting blocks should be made adjustable, for instance, with a screw type adjustment in the insulating blocks. The voltage supply may be conventional and is preferably also adjustable with knob 10' to make proper adjustment for varying conditions such a humidity.

The adjustment is made by increasing the voltage, with nothing between the needle points, until there is an output voltage across the resistor 11, due to corona discharge.

As the punch or aperture in the card or tape moves past the needle points there will be an output pulse P, which has a square wave leading edge corresponding to the leading edge of the punch. This gives extremely high resolution.

Therefore, the present invention provides pickup means for punch cards or tape which have no mechanical contact with the attendant difficulties caused by wear. The pickup of the present invention provides a high sensitivity and high resolution means for sensing punch cards. The term punched card in the specification and claims is meant to include punched tape or equivalent punched data means.

Many modifications may be made by those who desire to practice the invention without departing from the scope thereof which is defined by the following claims.

I claim:

1. Pickup means for punched cards comprising a pair of conductive members having sharp points, said points being spaced sufficiently to pass a punched card between said points without mechanical contact, and a source of high voltage connected to said points, means to insulate said points from ground sufficiently to prevent any electrode discharge except directly between said points, said voltage being adjusted to cause a corona discharge solely between said points in the absence of said card material.

2. Pickup means for punched cards comprising a pair of conductive members having sharp points, said points being spaced sufficiently to pass a punched card between said points without mechanical contact, a source of high voltage connected to said points, means to insulate said points from ground sufficiently to prevent any electrode discharge except directly between said points, said voltage being adjusted to cause a corona discharge solely between said points in the absence of said card material, and output means connected to said conductive members.

References Cited in the file of this patent

UNITED STATES PATENTS 2,716,826 Huebner ---------------- Sept. 6, 1955
2,861,220 Obolensky -------------- Nov. 18, 1958